Figures 1, 2, 3, 4:
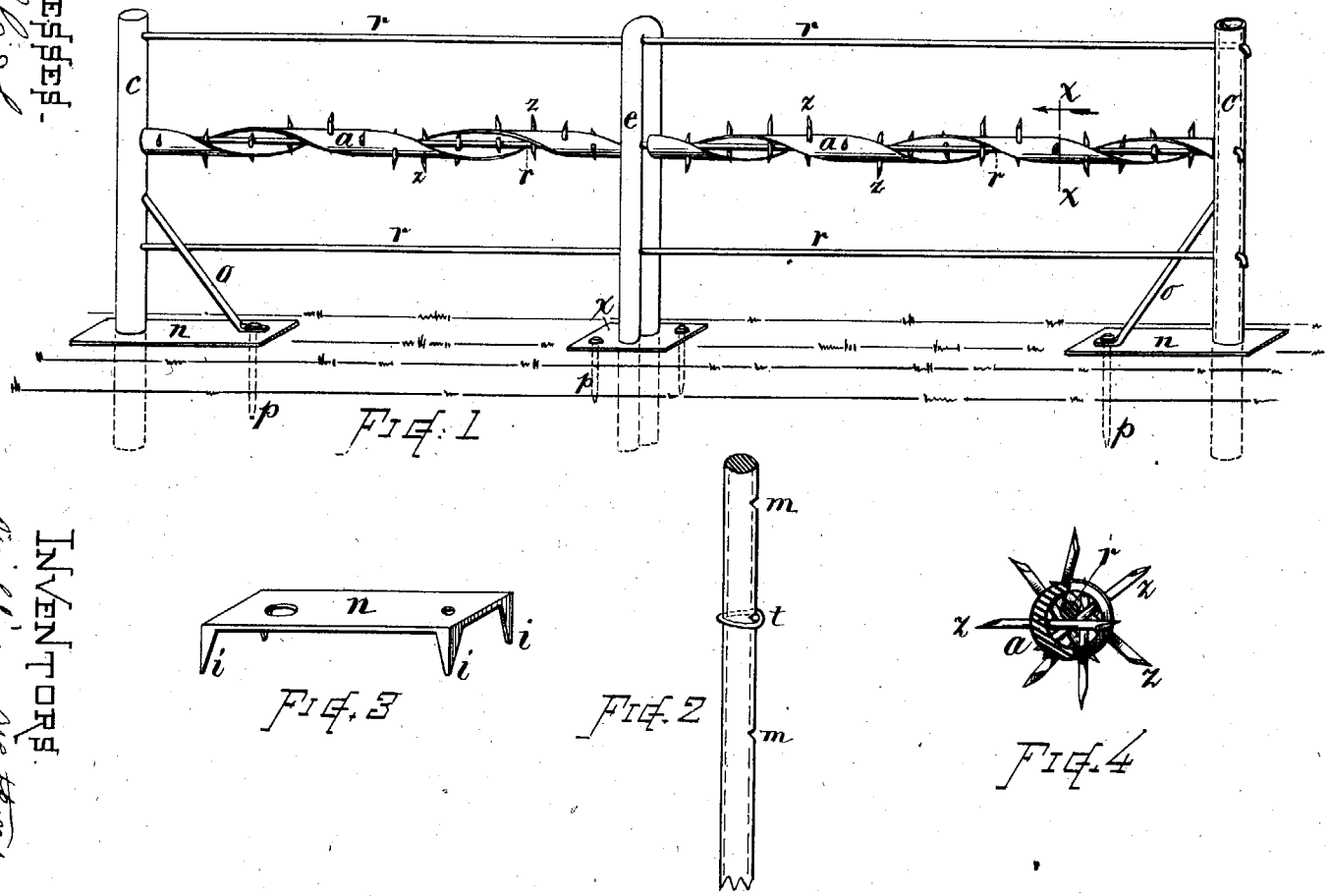

W. WATKINS & H. B. SCUTT,

Assignor to WASHBURN & MOEN MANUFACTURING COMPANY and I. L. ELLWOOD.

BARBED WIRE FENCE.

No. 10,053. Reissued Mar. 7, 1882.

WITNESSES.

L. L. Cleburn

Thos. H. Dodge

INVENTORS.

William Watkins

Hiram B. Scutt

N. PETERS, Photo-Lithographer, Washington, D. C.

UNITED STATES PATENT OFFICE.

WILLIAM WATKINS AND HIRAM B. SCUTT, OF JOLIET, ILLINOIS, ASSIGNORS TO WASHBURN & MOEN MANUFACTURING COMPANY, OF WORCESTER, MASSACHUSETTS, AND ISAAC L. ELLWOOD, OF DE KALB, ILLINOIS.

BARBED-WIRE FENCE.

SPECIFICATION forming part of Reissued Letters Patent No. 10,053, dated March 7, 1882.

Original No. 163,955, dated June 1, 1875. Application for reissue filed January 23, 1882.

*To all whom it may concern:*

Be it known that we, WILLIAM WATKINS and HIRAM B. SCUTT, of the city of Joliet, in Will county, and State of Illinois, have invented certain Improvements in Fences, of which the following is a specification.

Our invention consists of a twisted metal strip or rod provided with metal barbs or points passing entirely through at short intervals and sharp at both ends, in combination with a wire rod around which it is intertwined.

It also consists of the combination of a barbed twisted metal strip with a fence-wire around which it is wrapped or coiled for the purpose of turning stock.

Figure 1 is a perspective view of the fence with the twisted barb-rod attached. Fig. 2 represents, upon an enlarged scale, one of the fence-posts. Fig. 3 represents, upon an enlarged scale, a perspective view of one of the metal plates or feet for properly securing the posts in position; and Fig. 4 represents, upon an enlarged scale, a cross-section of the fence on line *x x*, Fig. 1.

Referring to the drawings, *a*, Fig. 1, represents the twisted barbed rod applied to one of the wire bars *r* of the fence. The barbs or points *z* pass entirely through the rod *a* and are sharpened at both ends, as shown in Fig. 4. By twisting the rod *a* around the wire bar *r* of the fence, as shown in Fig, 1, the points or barbs *z* are caused to point in every direction, as shown in Fig. 1, so it is impossible for stock to press against the fence without encountering some of them. This rod *a* may be secured at either end to the wire rod *r* by means of being wired to it, or in any other manner. The twisted metal rod *a* may be of any convenient length, shape, or size, and may be applied to any or all of the wire bars of the fence, as desired. The entire fence is intended to be constructed of metal.

The permanent stretch-posts *c c* are furnished with metal feet *n n*, through which they pass, as shown, into the ground below, as any ordinary post. These feet *n* are intended to keep the posts from leaning over from whatever cause. The feet *n* are provided with prongs *i i* at each lower corner, which enter into the ground and prevent their sliding on the surface of the ground.

*o o* are braces to brace the post *c* to support the strain of the wire bars *r*, and are secured at the foot by pins *p*, which pass down through the foot-plate *n* and brace *o* into the earth below, to give greater firmness to all.

*e*, Fig. 1, is an intervening post, through which the wires *r* pass for support, as shown. This post is constructed of metal by bending a rod of metal double and leaving holes between the legs for the wires *r* of the fence to pass, as shown. This intervening post may be constructed as shown in Fig. 2, and have the wires *r* pass through notches *m* on the side and held by the wire *t*. The posts may all be hollow or solid, as desired. The intervening post, *e*, is furnished with a foot-plate, *x*, similar to the others, which is likewise held down more firmly by pins *p* passing through, as shown.

This fence is intended more particularly for railroads and farm-fences; but the twisted barbed rod *a'* may be applied to the wires of any common wire fence in length suited to the lengths of the panels.

We are aware that metal strips or flattened wires have been provided with barbs by projecting the barbs through the strips or flattened wires, as in the Kelly patent of November 17, 1868; and by forming the barb by slitting the edges of a metal strip, as in the Judson patent of August 15, 1871; also, that it has been proposed to run pointed pieces of wire through strips of wood, as in the Rose patent of May 13, 1873; but we are the first to combine one of these barbed sheet metal strips with a fence-wire by wrapping it around the fence-wire in such a manner as to project the points of the barbs in different directions, so as to deter animals from crowding against the wire clothed with this barbed strip, and make a fence each strand of which is composed of an ordinary fence-wire and a barbed sheet-metal strip wrapped around the wire.

It is obvious that the wire and barbed strip combined by wrapping a barbed strip around the wire will make a much more efficient and durable strand of fencing than either one separately.

We are aware that a barbed strip spirally twisted has been combined with two wires by being placed between them, as in the J. Haish patent of June 23, 1874; but we wrap the barbed strip completely around the wire, thus forming a stronger and more durable combination of the two in forming the strand of fencing.

It will be seen from the foregoing description that the fence-wire extends centrally through the series of wraps of the encircling barbed metal strip, and therefore the fence-wire is not intertwisted with the barbed strip, but the latter encircles the former with a series of uniform wraps or coils, thereby producing a novel construction in the manufacture of barbed fencing for turning stock.

Having thus described our invention, what we claim as new, and desire to secure by Letters Patent, is as follows:

1. The attachment of wire fences herein described, consisting of wire-encircling strip *a*, formed of spiral metal and having barbs *z* projecting through the sides thereof, constructed as and for the purposes described.

2. The combination, with a fence-wire, of a barbed metal strip, the metal strip being wrapped around or encircling the wire to form a strand of barbed fencing for the purpose of turning stock, as set forth.

WILLIAM WATKINS.
HIRAM B. SCUTT.

Witnesses:
L. L. COBURN,
THOS. H. DODGE.